United States Patent [19]

Crupi, Jr.

[11] Patent Number: 4,948,327

[45] Date of Patent: Aug. 14, 1990

[54] TOWING APPARATUS FOR COUPLING TO TOWED VEHICLE UNDERCARRIAGE

[76] Inventor: Theodore P. Crupi, Jr., 197 Lamberts La., Staten Island, N.Y. 10314

[21] Appl. No.: 250,702

[22] Filed: Sep. 28, 1988

[51] Int. Cl.$^5$ ............................................. B60P 3/12
[52] U.S. Cl. ................................. 414/563; 280/402; 410/22
[58] Field of Search .................. 414/253, 255, 563; 410/22, 9, 19; 280/402, 47.15, 503, 444; 254/DIG. 4

[56] References Cited

U.S. PATENT DOCUMENTS

| | | | |
|---|---|---|---|
| 1,426,164 | 8/1922 | Evans | 410/22 |
| 1,472,003 | 10/1923 | Holt | 414/563 X |
| 1,783,189 | 12/1930 | Green | 414/563 X |
| 2,793,770 | 5/1957 | St. Denis | 414/563 |
| 4,564,207 | 1/1986 | Russ et al. | 414/563 X |
| 4,798,509 | 1/1989 | Bubik | 414/563 |
| 4,822,089 | 4/1989 | Moore et al. | 414/563 X |

FOREIGN PATENT DOCUMENTS

| | | | |
|---|---|---|---|
| 2821436 | 11/1979 | Fed. Rep. of Germany | |
| 807549 | 10/1936 | France | 414/563 |
| 789296 | 12/1980 | U.S.S.R. | 414/563 |
| 445931 | 4/1936 | United Kingdom | 414/563 |
| 760688 | 11/1956 | United Kingdom | |

OTHER PUBLICATIONS

Brochure of Holmes International, Publn 85-354, Key Features of 1101 and 1201 Wreckers.

Primary Examiner—Frank E. Werner
Attorney, Agent, or Firm—Kenyon & Kenyon

[57] ABSTRACT

Apparatus adapted to be disposed on a first motor vehicle for lifting a second motor vehicle at least partly from the ground whereby the first motor vehicle can tow the second motor vehicle comprising a first arm pivotable about a first pivot point on the first motor vehicle and extending toward the rear of the first motor vehicle, a force supplying device coupled to the first arm and further coupled to the first motor vehicle for providing a force to the first arm to move the first arm about the first pivot point, thereby raising a rearward end of the first arm, and further comprising a second arm coupled to the rearward end of the first arm and disposed transverse to the first arm and having two ends, respective third arms being disposed at the ends perpendicular to the second arm and extending rearwardly, the third arms further including at least two retaining projections disposed thereon and extending upwardly and spaced an adjustable distance apart for engaging an undercarriage portion of the second motor vehicle to be towed between the retaining projections, an adjusting device further being provided for adjusting the distance between the retaining projections to accommodate the undercarriage portion, the force supplying device moving the first arm whereby when the undercarriage portion of the second motor vehicle is engaged by the third arms between the retaining projections, the force supplying device can be activated to at least partly lift the second motor vehicle from the ground for towing.

19 Claims, 5 Drawing Sheets

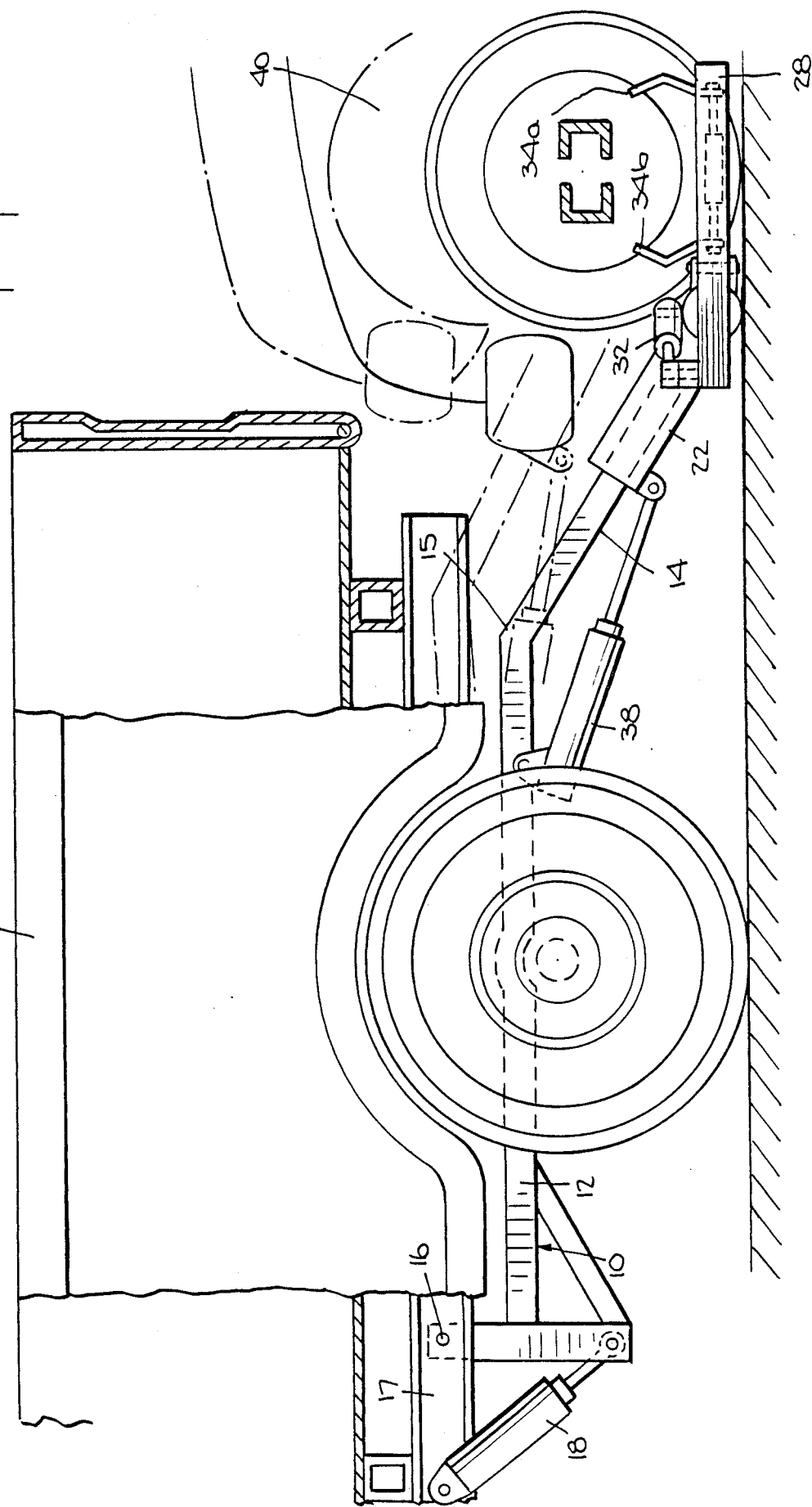

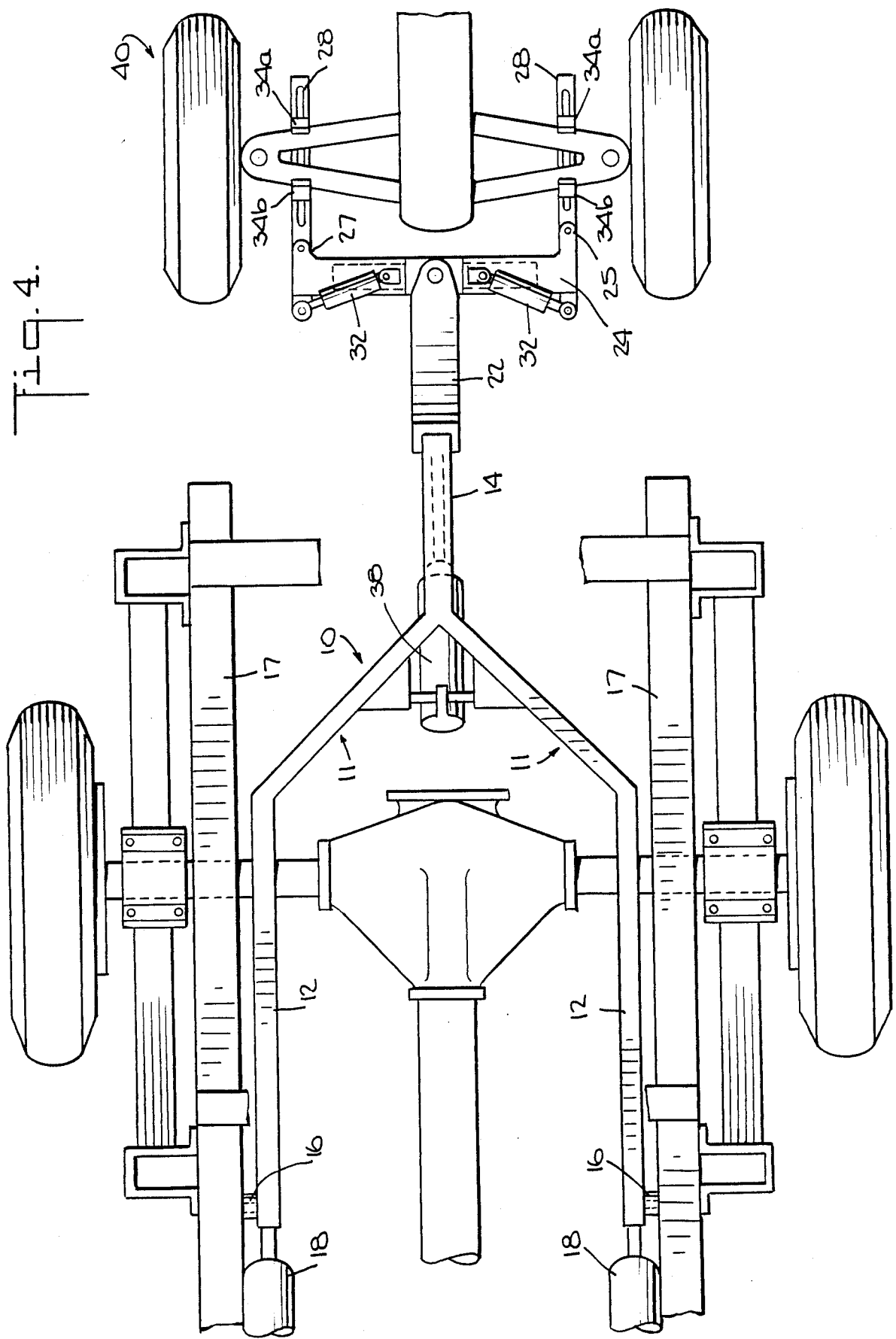

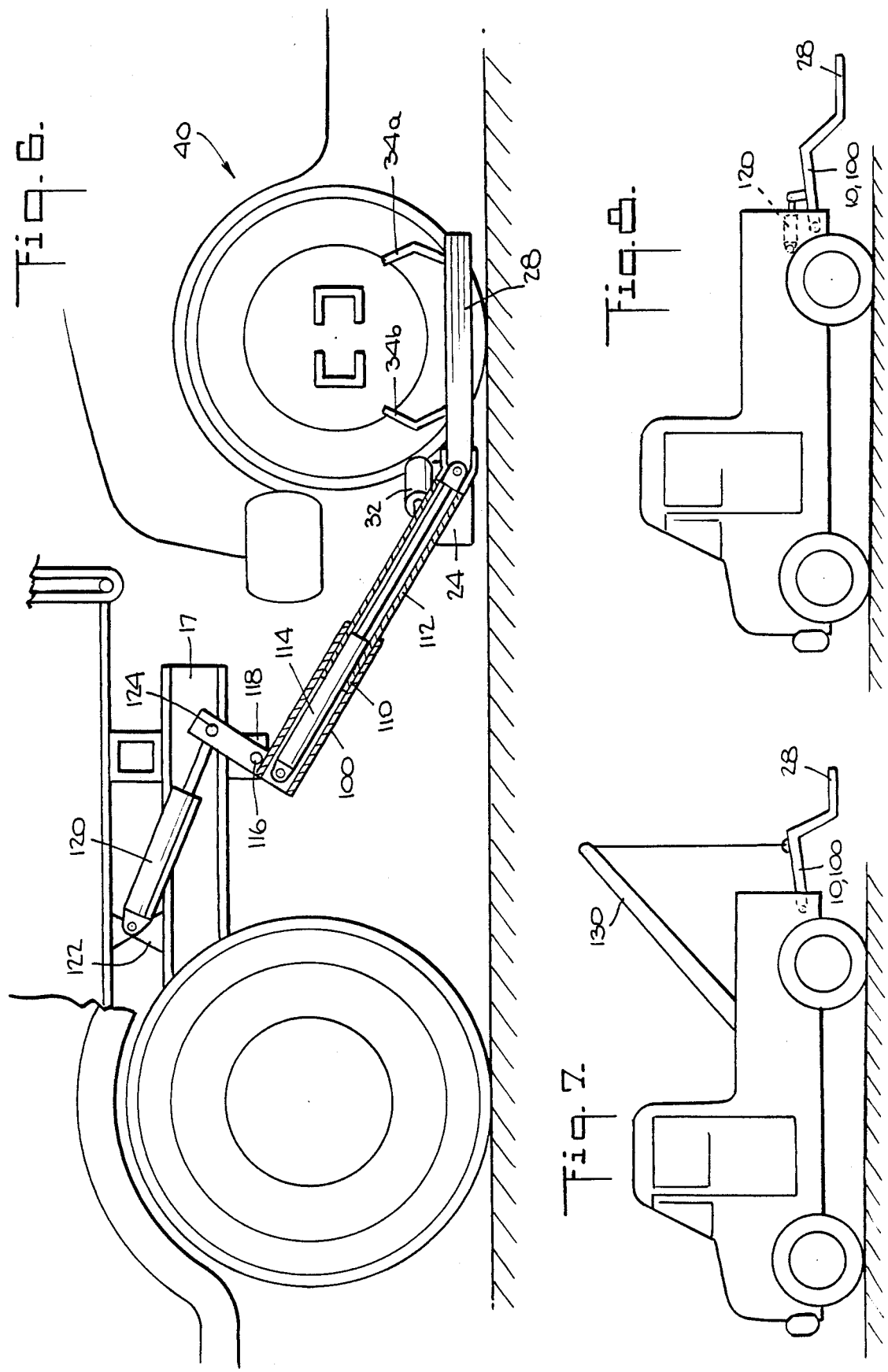

TOWING APPARATUS FOR COUPLING TO TOWED VEHICLE UNDERCARRIAGE

CROSS REFERENCE TO RELATED APPLICATIONS

This application is related to co-pending commonly owned U.S. application Ser. No. 076,359 for UNDER-VEHICLE TOWING APPARATUS filed July 22, 1987 in the name of Theodore P. Crupi, now U.S. Pat. No. 4,815,915.

BACKGROUND OF THE INVENTION

The present invention relates to an apparatus for towing a disabled vehicle, and in particular, to a towing apparatus adapted to engage the underside of a disabled vehicle thereby preventing damage to the exterior surfaces of the vehicle, such as fenders and bumpers, and furthermore preventing damage to tires and wheels of the towed vehicle. The present invention may be used with a conventional crane or hoist type of towing apparatus or it may be used with the under-vehicle towing apparatus described in the above-identified co-pending patent application.

Various types of towing apparatus are known. Applicant is aware of the following references for vehicle towing apparatus:

British Pat. No. 760,688 to Wilson, et al and German OS No. 2821436; and the following U.S. patents:
U.S. Pat. No. 2,625,279 to Dalby, et al
U.S. Pat. No. 4,573,857 to Porter, Sr., et al
U.S. Pat. No. 4,674,943 to Nespor
U.S. Pat. No. 4,634,337 to Hamman
U.S. Pat. No. 2,715,470 to Marcus, et al
U.S. Pat. No. 4,637,623 to Bubik
U.S. Pat. No. 2,603,370 to Hanzel
U.S. Pat. No. 3,716,152 to Sloter
U.S. Pat. No. 2,951,601 to Castoe
U.S. Pat. No. 2,283,443 to Klein
U.S. Pat. No. 3,929,237 to Schaedler
U.S. Pat. No. 3,700,125 to Aquila
U.S. Pat. No. 3,794,192 to Monson
U.S. Pat. No. 4,000,823 to Aquila
U.S. Pat. No. 4,264,262 to LoCodo
U.S. Pat. No. 3,152,814 to Wegener, et al
U.S. Pat. No. 2,551,745 to Hutchings
U.S. Pat. No. 4,473,237 to Lind
U.S. Pat. No. 4,268,213 to Obbink
U.S. Pat. No. 4,557,496 to Sill
U.S. Pat. No. 3,667,631 to Bishop
U.S. Pat. No. 4,679,978 to Holmes
U.S. Pat. No. 4,384,817 to Peterson
U.S. Pat. No. 3,313,432 to Sheldrew
and a brochure of Holmes International, Publication No. 85-354 for the 1101 and 1201 Wreckers.

Of the above references, the patents to Porter, Sr., et al, Nespor, Hamman, Bubik, Schaedler, LoCodo, Lind, Sill, Holmes, Peterson and the Holmes International reference show various types of towing apparatus which are of the "damage-free" variety wherein the wheels of the disabled vehicle are engaged by a suitable grasping or support mechanism and then the vehicle is lifted on the grasping or support mechanism to allow the vehicle to be towed. All of these arrangements are complicated and require that the operator securely fasten straps or other grasping devices to the wheels in order to ensure that the towed vehicle is secure.

The other references show various other types of towing apparatus wherein conventional hooks, chains or straps for grasping various parts of the vehicle, for example, axles or bumpers, are used.

The Marcus, et al reference shows a towing apparatus having an extension platform having a U-shaped axle engaging frame member mounted rotatably thereon on a kingpin and having extremities which are provided with notches aligned on a concave arc for grasping an axle of a towed vehicle.

The towing devices shown in these references suffer the disadvantages that they are likely to cause damage to the vehicle to be towed because of the use of straps and chains which may touch body and bumper surfaces of the vehicle being towed.

SUMMARY OF THE INVENTION

It is an object of the present invention to provide a towing apparatus which engages solely with a selected undercarriage portion of a vehicle being towed and which does not have any parts which engage with body and bumper surfaces of the vehicle being towed.

It is furthermore an object of the present invention to provide a towing apparatus which can be used with conventional crane-hoist type towing vehicles and also with under-vehicle mounted towing apparatus of the type disclosed in the above identified co-pending patent application.

It is yet still another object of the present invention to provide a towing apparatus which when not in use can be conveniently folded for storage purposes, and, when used with the under-vehicle towing apparatus of the above identified co-pending application, as described herein, can be stored beneath the body of the towing vehicle, thereby preserving the body of the towing vehicle for other purposes.

It is furthermore an object of the present invention to provide a towing apparatus which is simple to manufacture and to operate.

The above and other objects of the present invention are achieved by an apparatus adapted to be disposed on a first motor vehicle for lifting a second motor vehicle at least partly from the ground whereby the first motor vehicle can tow the second motor vehicle, comprising first arm means pivotable about a first pivot point on the first motor vehicle and extending toward the rear of the first motor vehicle, force supplying means coupled to the first arm means and further coupled to the first motor vehicle for providing a force to the first arm means to move the first arm means about the first pivot point, thereby raising a rearward end of the first arm means, and further comprising second arm means coupled to the rearward end of the first arm means and disposed transverse to the first arm means and having two ends, respective third arm means being disposed at the ends perpendicular to the second arm means and extending rearwardly, each of the third arm means further including at least two retaining means disposed thereon and extending upwardly and spaced an adjustable distance apart for engaging an undercarriage portion of the second motor vehicle to be towed between the retaining means, adjusting means further being provided for adjusting the distance between the retaining means to accommodate the undercarriage portion, the force supplying means moving the first arm means whereby when the undercarriage portion of the second motor vehicle is engaged by the third arm means between the retaining means, the force supplying means can be activated to at least partly lift the second motor vehicle from the ground for towing.

Other objects, features and advantages of the present invention will be apparent from the detailed description which follows.

BRIEF DESCRIPTION OF THE DRAWINGS

The invention will be described in greater detail in the following detailed description with reference to the drawings, in which:

FIG. 3 is a side view of one embodiment of the towing apparatus according to the present invention in position prior to engaging a vehicle to be towed;

FIG. 4 is a top view of the towing apparatus according to the present invention showing the apparatus engaging a vehicle to be towed;

FIG. 5 shows an alternative embodiment of the towing apparatus according to the present invention;

FIG. 6 shows another embodiment of the towing apparatus according to the present invention; and FIGS. 7 and 8 show additional alternative embodiments.

DETAILED DESCRIPTION

Figure 1:
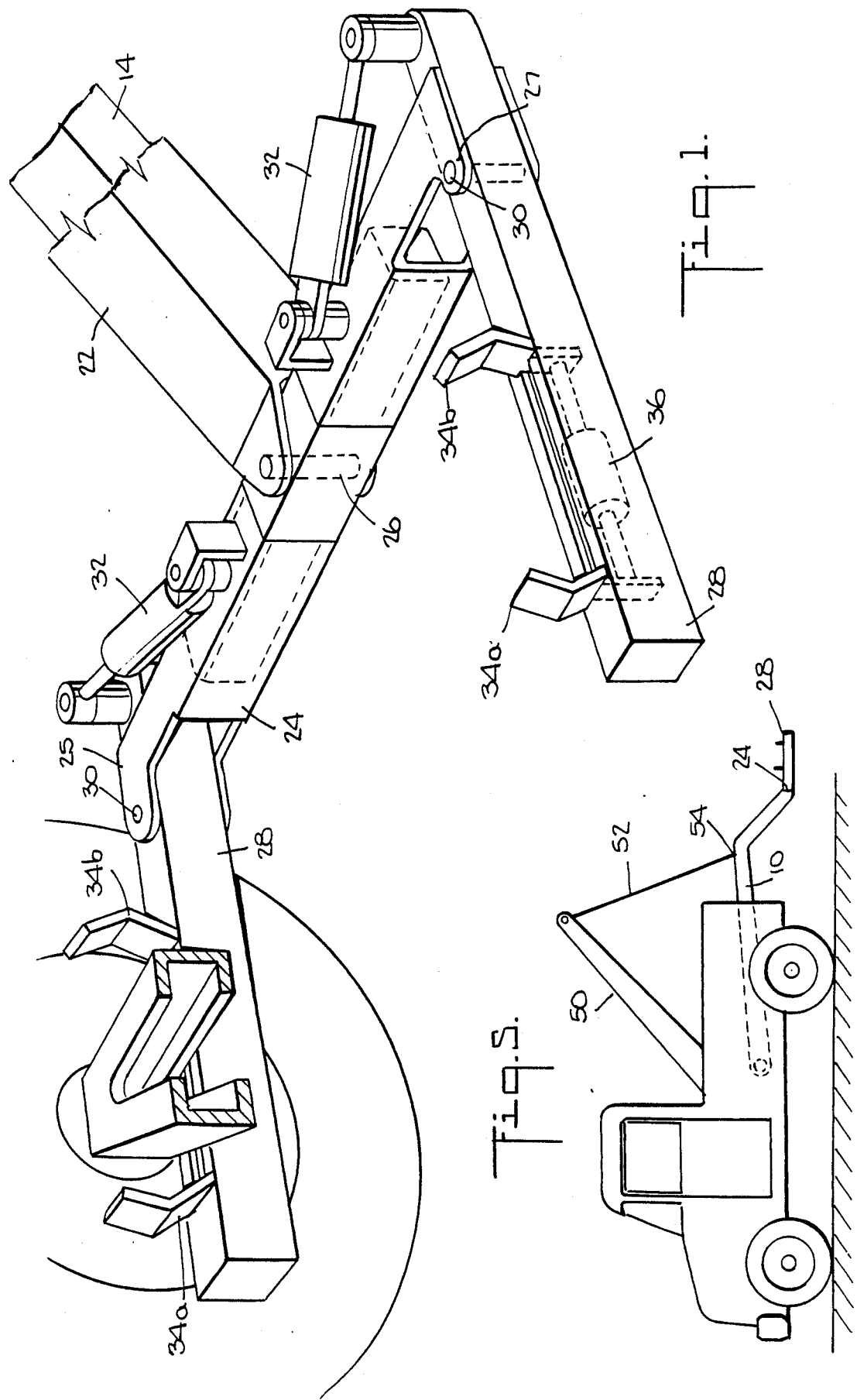
FIG. 1 is a perspective view of a part of the towing apparatus according to the present invention adapted to engage an undercarriage portion of the vehicle to be towed.
Figure 2:
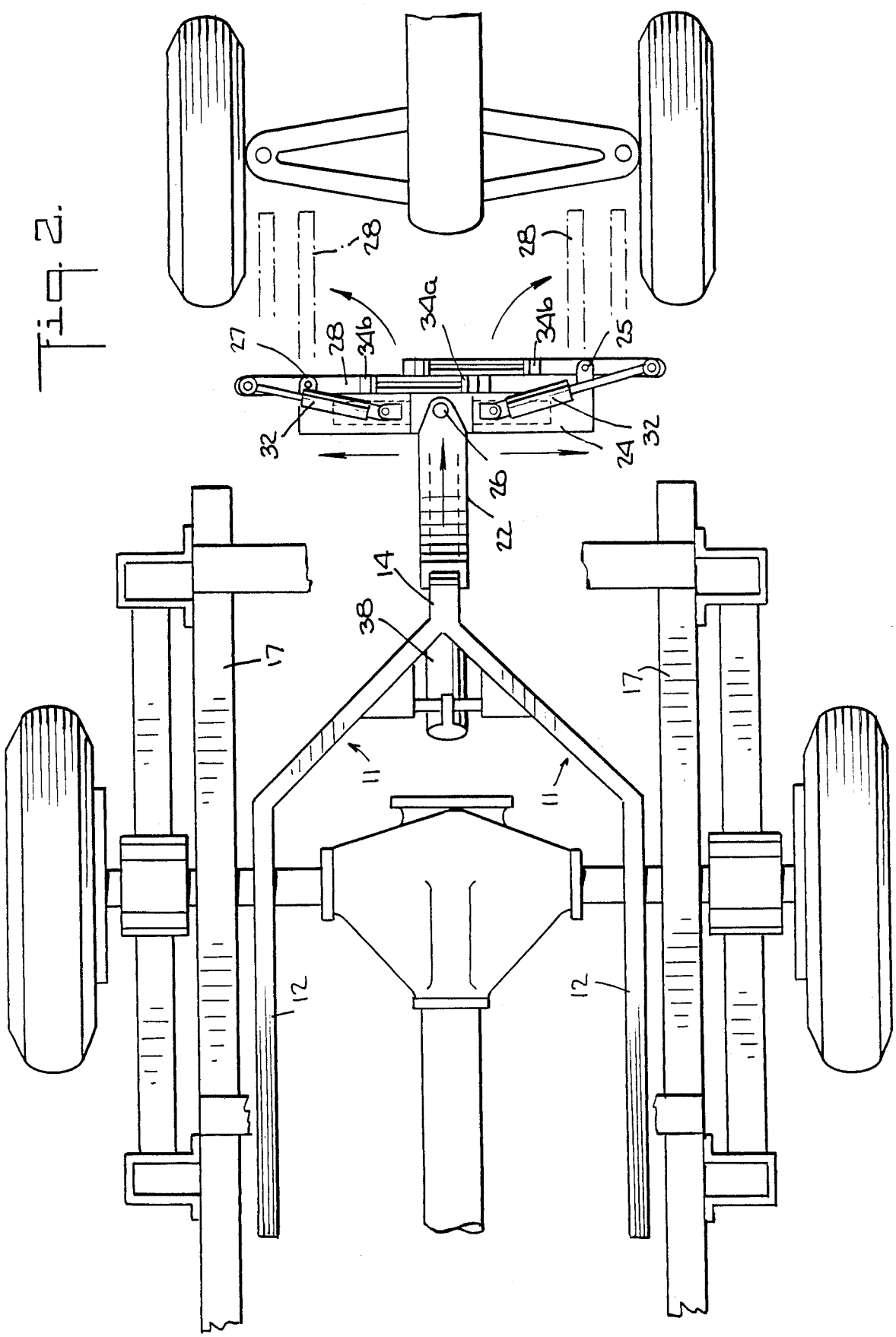
FIG. 2 is a top view of one embodiment of a towing apparatus according to the present invention prior to its engagement of a vehicle to be towed.

With reference now to the drawings, the towing apparatus according to the present invention may include, in one embodiment, a rearwardly extending boom 10 which is mounted for pivotal movement beneath the body of a towing vehicle, as shown in FIGS. 2, 3 and 4 of the drawings. The boom 10 may comprise two parallel arms 12 which are angled towards each other at 11 and connected into a rearwardly extending portion 14 to which a mechanism according to the present invention for engaging a vehicle to be towed is coupled. As shown in FIG. 3, the arms 12 may be pivotally mounted at a location 16 disposed on the frame 17 of the towing vehicle. Although the pivot point 16 is shown below the body of the towing vehicle and disposed between the front and rear axles, providing excellent weight distribution of the vehicle being towed to the towing vehicle, the pivot point can be located at any suitable location. An hydraulic member 18 may be provided for moving the arms 12 up or down about the pivot point 16. The towing vehicle may be a conventional pick-up truck having a body 20 disposed on the chassis frame rails 17. As shown particularly in FIG. 1, the apparatus of the present invention provides a mechanism for engaging the underside of a vehicle to be towed, for example, a front or rear suspension component, such as the lower control arms of the front or rear suspension of a motor vehicle or an axle member. Preferably, the engaging mechanism of the present invention is collapsible for easy stowability, as shown in FIG. 2, and to be explained in greater detail below.

The vehicle engaging mechanism of the present invention comprises a telescoping outer member 22 which is slidable on the rearwardly extending boom portion 14. The rearwardly extending boom portion 14 may be directed at an angle towards the ground, as shown in the drawing figures at 15. A transverse member 24 is pivotally connected to telescoping member 22 at pivot point 26. Two pivotably mounted arms 28 are mounted at the left and right extremities of the transverse member 24 at pivot points 30. Suitable hydraulic members 32 are coupled between the arms 28 and transverse arm 24 for allowing arms 28 to be pivoted about pivot points 30 so that the arms can be stored in a collapsed condition shown in FIG. 2 when the apparatus of the present invention is out of use.

Disposed on pivotal arms 28 are two retaining members 34a and 34b. At least one of retaining members 34a and 34b is slidably disposed on arm 28, for allowing adjustment of the distance between the retaining members 34a and 34b. In the embodiments shown in the figures, both retaining members 34a and 34b are slidable relative to each other by a suitable hydraulic mechanism 36, but only one of the member 34a and 34b need be so movable. Preferably, members 34a and 34b have a hook or bent shape as shown to provide secure vehicle engagement.

As shown in the figures, retaining members 34a and 34b are designed to engage a portion of the vehicle suspension, for example, an axle or a front or rear suspension control arm. Operation of the apparatus according to the invention will now be explained.

As shown in FIG. 2, the towing vehicle is positioned in front of the disabled vehicle, shown simplified at 40 in the drawings. The hydraulic mechanism 18 is activated to lower the boom 10. The hydraulic mechanism 38 which operates telescoping member 22 is activated to lower telescoping member 22 towards the ground. The towing vehicle is then backed toward the disabled vehicle with the arms 28 moving below the chassis of the disabled vehicle between two wheels, and the hydraulic members 32 are activated to place arms 28 in their extended position, disposing retaining members 34a and 34b beneath the vehicle to be towed. Hydraulic mechanism 38 may be suitably activated to properly position the retaining members 34a and 34b beneath an undercarriage portion of the portion of the disabled vehicle to be engaged, for example, an axle for suspension control arm. Hydraulic mechanism 18 is then activated to raise boom 12, and thus retaining members 34a and 34b mounted on arms 28, thereby allowing arms 28 to engage the undercarriage portion of the vehicle. Suitable protective padding may be applied to a portion of arms 28 between retaining members 34a and 34b, and also to members 34a and 34b. Mechanisms 36 are then activated to move at least one of retaining members 34a and 34b on each arm 28 towards each other, grasping the selected undercarriage portion of the vehicle. Preferably, both members 34a and 34b are movable, thereby providing assurance that both retaining members 34a and 34b will contact the selected portion of the vehicle with the least amount of vehicle maneuvering or activation of hydraulic member 38.

FIG. 3 shows the apparatus of the present invention after the arms 28 have been moved into the operating position and after the arms 28 have been disposed in position below the selected portion of the vehicle to be engaged by the retaining members 34a and 34b. FIG. 1 shows arms 28 moved into position directly below the portion of the vehicle to be engaged by the retaining members 34a and 34b prior to movement of the retaining members 34a and 34b into contact with the selected undercarriage vehicle portion.

As shown in FIG. 2, in the retracted position, arms 28 are folded against transverse arm 24. In order to accomplish the most efficient storage of the arms, an ear 25 can be provided at one extremity of a transverse arm 24 which is longer than the corresponding arm 27 at the other extremity of transverse arm 24, thereby allowing folding of the arms 28 against each other adjacent arm 24 as shown in FIG. 2.

In an alternative embodiment of the present invention, a conventional crane-hoist 50, as shown in FIG. 5 having a cable or chain 52 may be coupled to the boom 10 at 54, in order to raise the boom 10 and thus the vehicle to be towed from the ground.

Although the present invention has been shown as being utilized with a boom 10 having a pivot point disposed near the center of the towing vehicle, thus providing the weight distribution advantages provided by the towing apparatus described in co-pending application Ser. No. 076,359 discussed above, the present invention can also be utilized with a towing apparatus having a boom 10 which pivots at any other suitable place, e.g., behind the rear axle of the vehicle, for example, as shown in the Bishop reference, U.S. Pat. No. 3,667,631.

Providing the pivot point 16 substantially ahead of the rear axle, i.e., between the front and rear axles, has the advantage that the weight of the towed vehicle is evenly distributed to the towing vehicle.

FIG. 6 shows an additional embodiment of the invention wherein the pivot point is disposed behind the rear axle. This embodiment does not have the advantage of the embodiment shown in FIG. 3 of balanced weight distribution, but may provide advantages in fitting the device to the towing vehicle since the mechanism is disposed entirely at the rear of the towing vehicle. As shown in FIG. 6, this embodiment of the invention comprises a boom 100 which comprises a first outer telescoping member 110 into which an inner telescoping member 112 is received. Boom 100 may include an hydraulic ram 114 located inside the first telescoping member 110 for retracting the second telescoping member 112. Boom 100 is pivoted at a pivot point 116 disposed on a bracket 118 mounted to the frame 17 of the vehicle. A second hydraulic ram 120 is also provided for raising and lowering the boom 100. Hydraulic ram 120 is mounted to the frame via a bracket 122 and coupled to the boom 100 via a bracket 124.

In all other respects, the arrangement shown in FIG. 6 is similar to the arrangement previously described.

FIGS. 7 and 8 show additional embodiments of the present invention with the boom 10, 100 being mounted pivotably at the rear of the vehicle. As shown, a conventional crane 130 can be utilized to raise and lower the boom 100, or the hydraulic ram 120 can be mounted as shown in FIG. 8. In both cases, the pivot point is disposed behind the rear axle, simplifying the attachment of the mechanism according to the invention to a towing vehicle to some extent.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. Apparatus adapted to be disposed on a first motor vehicle for lifting a second motor vehicle at least partly from the ground whereby the first motor vehicle can tow the second motor vehicle, comprising:

first arm means pivotable about a first pivot point on the first motor vehicle and extending toward the rear of said first motor vehicle;

first force supplying means coupled to said first arm means and further coupled to the first motor vehicle for providing a force to said first arm means to move the first arm means about the first pivot point, thereby raising a rearward end of said first arm means; and further comprising second arm means coupled to the rearward end of the first arm means and disposed transverse to said first arm means and having two ends, respective third arm means being disposed pivotally at said ends of said second arm means for movement in a substantially horizontal plane and extending rearwardly, second force supplying means for causing movement of said third arm means, each of said third arm means further including at least two retaining means disposed thereon and extending upwardly and spaced an adjustable distance apart for engaging an undercarriage portion of the second motor vehicle to be towed between said retaining means, adjusting means comprising active third force supplying means being provided for adjusting the distance between said retaining means to accommodate said undercarriage portion, said retaining means being operated by said third force supplying means in opposite directions, said third force supplying means being disposed on said third arm means, at least one of said retaining means on each third arm means being movably disposed on said third arm means, said first force supplying means moving said first arm means whereby when said undercarriage portion of the second motor vehicle is engaged by said third arm means between the retaining means, said first force supplying means can be activated to raise said first, second and third arm means and at least partly lift said second motor vehicle from the ground for towing.

2. The apparatus recited in claim 1, wherein said adjusting means comprises hydraulic cylinder means.

3. The apparatus recited in claim 1, wherein at least one of said retaining means on each third arm means is slidably movable.

4. The apparatus recited in claim 1, wherein said first arm means extends to said first pivot point disposed beneath the body of said first motor vehicle, said first motor vehicle having a front and rear axle, said first pivot point being located between said front and rear axles substantially ahead of said rear axle.

5. The apparatus recited in claim 1, wherein said first motor vehicle has a rear axle, said first pivot point being located behind said rear axle.

6. The apparatus recited in claim 1, wherein said first force supplying means comprises hydraulic cylinder means disposed beneath the body of the first motor vehicle.

7. The apparatus recited in claim 1, wherein said first force supplying means comprises cable means extending from a crane mounted to the body of the first motor vehicle.

8. The apparatus recited in claim 1, wherein each of said third arm means are pivotable about pivot points at said ends of said second arm means, thereby allowing said third arm means to be folded adjacent said second arm means for stowing.

9. The apparatus recited in claim 8, wherein said third force supplying means folds each of said third arm means about said pivot points at said ends of said second arm means.

10. The apparatus recited in claim 1, wherein said second arm means is pivotably mounted to said first arm means.

11. The apparatus recited in claim 1, wherein said first arm means includes first and second telescoping members for moving said second arm means in a substantially horizontal direction toward or away from the rear of said first motor vehicle.

12. The apparatus recited in claim 11, further comprising additional force supplying means for moving said telescoping members.

13. The apparatus recited in claim 11, wherein said first arm means has a substantially straight first portion extending from said first pivot point rearwardly, and a substantially straight second portion extending at an angle from said first portion rearwardly toward the ground.

14. The apparatus recited in claim 13, wherein said telescoping members are disposed in said second portion of said first arm means.

15. The apparatus recited in claim 1, wherein each of said retaining means on the respective third arm means are movable.

16. The apparatus recited in claim 1 wherein said retaining means are hook-shaped for engaging the undercarriage portion of the second motor vehicle.

17. The apparatus recited in claim 1 wherein said adjusting means is disposed beneath said retaining means between said retaining means.

18. The apparatus recited in claim 1, wherein each of said third arm means are provided with protective padding on a portion thereof between the retaining means.

19. The apparatus recited in claim 18 wherein said retaining means are provided with protective padding.

* * * * *